US011000896B2

(12) United States Patent
Gong et al.

(10) Patent No.: US 11,000,896 B2
(45) Date of Patent: May 11, 2021

(54) PREPARATION METHOD OF TUNGSTEN PARTICLE REINFORCED AMORPHOUS MATRIX COMPOSITES

(71) Applicant: Huazhong University of Science and Technology, Hubei (CN)

(72) Inventors: Pan Gong, Hubei (CN); Xinyun Wang, Hubei (CN); Yunfei Ma, Hubei (CN); Lei Deng, Hubei (CN); Junsong Jin, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 439 days.

(21) Appl. No.: 15/941,838

(22) Filed: Mar. 30, 2018

(65) Prior Publication Data

US 2019/0232366 A1    Aug. 1, 2019

(30) Foreign Application Priority Data

Jan. 29, 2018 (CN) .......................... 201810083868.0

(51) Int. Cl.
*B22F 3/00* (2021.01)
*B22F 1/00* (2006.01)
(Continued)

(52) U.S. Cl.
CPC ............ *B22F 3/006* (2013.01); *B22F 1/0011* (2013.01); *B22F 1/0062* (2013.01);
(Continued)

(58) Field of Classification Search
CPC .......... B33Y 80/00; B33Y 70/00; B33Y 10/00
See application file for complete search history.

(56) References Cited

U.S. PATENT DOCUMENTS 5,204,055 A * 4/1993 Sachs ...................... B05C 19/04
                                                   419/2
5,660,621 A * 8/1997 Bredt ..................... B33Y 70/00
                                                   106/287.34
(Continued)

FOREIGN PATENT DOCUMENTS

CN          2093970 U  *  1/1992
CN       105965013 A  *  9/2016

OTHER PUBLICATIONS

Zhao, Jianping. "Oxyhydrogen Welding Burner", 1992. Machine-generated text of CN2093970U. (Year: 1992).*
(Continued)

*Primary Examiner* — Alexandra M Moore
(74) *Attorney, Agent, or Firm* — Hamre, Schumann, Mueller & Larson, P.C.

(57) ABSTRACT

The invention belongs to the fields of amorphous alloy composites, additive manufacturing technology and hot isostatic pressing sintering forming, and in particular relates to a preparation method of tungsten particle reinforced amorphous matrix composites, comprising the following steps: (1) making tungsten powder and amorphous alloy powder into a preform by the micro-jetting and bonding 3D printing technology, specifically comprising: in the preforming process by micro-jetting and bonding, through a double-drum type powder feeding device, spraying tungsten powder and amorphous alloy powder into a layer of uniformly mixed powder layer by double nozzles, then bonding the powder layer into a bonding layer by the binder, and repeating the operations of spraying the powders and binder, so that a preform with uniform particle phase distribution is finally prepared; (2) placing the preform in a capsule, and performing heating and vacuumizing on the capsule in a heating furnace; and (3) placing the capsule in the hot isostatic pressing sintering furnace and performing hot press forming (Continued)

to obtain an amorphous matrix composite. In the present invention, through combining the cold additive micro-jetting and bonding technology with hot isostatic pressing sintering forming, a tungsten particle reinforced amorphous matrix composite with large size and uniform particle phase distribution can be prepared.

10 Claims, 7 Drawing Sheets

(51) Int. Cl.
  *B22F 3/15* (2006.01)
  *B22F 3/10* (2006.01)
  *B33Y 10/00* (2015.01)
  *B33Y 70/00* (2020.01)
  *C22C 1/04* (2006.01)
  *B33Y 80/00* (2015.01)
  *B22F 10/00* (2021.01)

(52) U.S. Cl.
  CPC .............. *B22F 3/1021* (2013.01); *B22F 3/15* (2013.01); *B22F 10/00* (2021.01); *B33Y 10/00* (2014.12); *B33Y 70/00* (2014.12); *B33Y 80/00* (2014.12); *C22C 1/045* (2013.01); *C22C 1/0458* (2013.01); *B22F 2201/20* (2013.01); *B22F 2301/205* (2013.01); *B22F 2304/10* (2013.01); *B22F 2998/10* (2013.01); *C22C 2200/02* (2013.01)

(56) References Cited

U.S. PATENT DOCUMENTS

| | | | | |
|---|---|---|---|---|
| 5,851,465 | A * | 12/1998 | Bredt | B41M 3/16 264/109 |
| 7,361,239 | B2 * | 4/2008 | Zahrah | B22F 1/0003 148/423 |
| 2005/0023710 | A1 * | 2/2005 | Brodkin | A61K 6/807 264/16 |
| 2016/0158843 | A1 * | 6/2016 | Yolton | B22F 3/15 419/6 |
| 2016/0243621 | A1 * | 8/2016 | Lucas | B22F 3/1258 |
| 2017/0173692 | A1 * | 6/2017 | Myerberg | B22F 3/24 |
| 2017/0197246 | A1 * | 7/2017 | Wachter | B22F 3/24 |
| 2018/0345366 | A1 * | 12/2018 | Hofmann | C22C 16/00 |

OTHER PUBLICATIONS

Ding et al. "Multi-component real-time control precise powder feeding system for metal 3D printing", machine-generated text of CN105965013A. (Year: 2016).*

Francis et al. "Materials Processing—A Unified Approach to Processing of Metals, Ceramics and Polymers—Chapter 5", Academic Press, 2016, pp. 343-414. (Year: 2016).*

* cited by examiner

PREPARATION METHOD OF TUNGSTEN PARTICLE REINFORCED AMORPHOUS MATRIX COMPOSITES

BACKGROUND OF THE INVENTION

Field of the Invention

The invention belongs to the fields of amorphous alloy composites, additive manufacturing technology and hot isostatic pressing sintering forming, and in particular relates to a preparation method of tungsten particle reinforced amorphous matrix composites.

Description of the Related Art

Amorphous alloys have, due to their unique amorphous structure, superior mechanical, physical and chemical properties compared to conventional crystalline alloys, such as high strength, good wear resistance and corrosion resistance, and thus have a wide range of applications in aerospace, precision instruments, military, chemical and other fields. However, as structural materials, the fatal defect of the amorphous alloys is the lack of macro-room-temperature plastic deformation capability, and the room-temperature brittleness of the amorphous alloys limits their application as structural materials. Therefore, it is considered to increase the plastic deformation of the amorphous material by adding a tough phase such as particles, fibers or wires to the amorphous matrix. The tungsten reinforced amorphous matrix composite is a novel material which has high strength, high hardness, good wear resistance and other excellent properties as well as a very superior armor-piercing performance, and thus has a potential application prospect for armor. Therefore, scholars at home and abroad have conducted extensive research on tungsten reinforced amorphous matrix composites. However, most of the researches focused on tungsten fiber or tungsten wire reinforced amorphous matrix composites, but few on tungsten particle reinforced amorphous matrix composites. The greatest advantage of selecting tungsten particles instead of tungsten fibers or tungsten wires as the reinforcing phase is that the tungsten particles can be uniformly and dispersedly distributed in the amorphous matrix without orientation, and the prepared amorphous matrix composite has better mechanical properties. At present, the Ma Guofeng team of Shenyang University has prepared tungsten particle reinforced amorphous matrix composites with a volume fraction of tungsten of 2% to 8% by mixing the tungsten powder and the amorphous alloy powder, melting the mixed powders in a tungsten electrode magnetic control arc furnace and then performing copper mold casting. The problem of this method is that it is difficult to prepare a tungsten particle reinforced amorphous matrix composite with a large volume fraction of tungsten. In addition, in this method, composition segregation may occur, the particle phase cannot be distributed uniformly and dispersedly in the amorphous matrix and the size of the amorphous matrix composite is obviously limited. The Qiu Keqiang team has prepared an amorphous matrix composite with a diameter of 10 mm and a volume fraction of tungsten of up to 60% by using the stainless steel tube water-quenching method, which specifically comprising: mixing the tungsten powder and the amorphous alloy powder in a ball mill, briquetting the mixed powder on a hydraulic press, putting the briquette into a steel tube, heating the briquette to a molten state and then quenching the melt contained in the stainless steel tube into saturated brine. However, the problems of the water-quenching method for preparing tungsten particle reinforced amorphous matrix composites are that the limitation of the cooling rate will directly affect the forming size of the amorphous matrix composites and that there exist crystallization and composition segregation. In addition, due to the difference in particle size and density of the powders, it is difficult to uniformly mix the powders by a ball mill, and meanwhile, it also cannot be ensured that the particle phase of the resulting amorphous matrix composite is uniformly distributed in the amorphous matrix. The Qiu Keqiang team also has prepared a tungsten particle reinforced Zr-based bulk metallic-glass matrix composite by the infiltration method, which specifically comprising: making the tungsten particles into a skeleton by sintering or cladding technology, then placing the tungsten particle skeleton on the lower end of a quartz tube, necking the quartz tube above the reinforcement body by about 1 cm, placing the amorphous matrix alloy on the necking, heating in the vacuum condition and finally performing the water quenching. However, the problem of this method is that in the process of preparing the skeleton by sintering, the tungsten particles may aggregate into particle clusters, which cannot ensure that the particle phase of the obtained amorphous matrix composite is uniformly and dispersedly distributed in the amorphous matrix, and meanwhile, the size of the amorphous matrix composite prepared by the water quenching method is limited due to the cooling rate.

In conclusion, at present, there are still problems such as size limitation and non-uniform particle phase distribution in the preparation methods of tungsten particle reinforced amorphous matrix composites. Therefore, it is necessary to provide a preparation method of large-size amorphous matrix composites in which a high content of small particle reinforcing phase is uniformly distributed.

SUMMARY OF THE INVENTION

In view of the above-described problems, the technical problem to be solved by the present invention is to overcome the limitation of preparing large-size amorphous matrix composites in which a high content of small particle tough phase is uniformly distributed. The present invention provides a preparation method of tungsten particle reinforced amorphous matrix composites, which fully combines the characteristics and requirements of the amorphous matrix composites and targetedly redesigns their forming method. Thus, a preparation method of large-size amorphous matrix composites in which a high content of small particle tough phase is uniformly distributed is correspondingly obtained, thereby solving the technical problem such as size limitation and non-uniform particle phase distribution in the preparation methods of bulk metallic-glass matrix composites in the prior art.

In order to achieve the above objective, according to one aspect of the present invention, there is provided a preparation method of tungsten particle reinforced amorphous matrix composites, comprising the following steps:

(1) making tungsten powder and amorphous alloy powder into a preform by the micro-jetting and bonding 3D printing technology, specifically comprising: in the preforming process by micro-jetting and bonding, through a double-drum type powder feeding device, successively spraying the amorphous alloy powder and the tungsten powder by double nozzles, then spraying the binder to bond the powders into a bonding layer, and repeating the operations of successively spraying the powders and spraying the binder to print a preform composed of multiple bonding layers;

(2) placing the preform in the step (1) in a capsule, and performing heating, heat preservation and vacuumizing on the capsule in a heating furnace, in which the heating temperature in the heating furnace is higher than a boiling point temperature of the binder in the step (1) and lower than a glass transition temperature of the matrix preform body of amorphous alloy and a melting point temperature of the capsule, so that the binder is gasified or decomposed into air and then discharged by vacuumizing;

(3) placing the capsule in the step (2) in a hot isostatic pressing sintering furnace and performing hot press forming to obtain an amorphous matrix composite, in which the hot isostatic pressure sintering temperature is between a glass transition temperature $T_g$ and an initial crystallization temperature $T_x$ of the amorphous alloy, and the hot isostatic pressing sintering forming time is shorter than the crystallization starting time of the amorphous alloy at the employed hot isostatic pressing sintering temperature.

Preferably, the selection criteria of the amorphous alloy are: an amorphous formation critical size of not less than 10 mm, a supercooled liquid phase interval $\Delta T_x$ of more than 50K and a thermoplastic forming capability index S of more than 0.15.

Preferably, the volume fraction of the tungsten powder in the total volume of the tungsten powder and the amorphous alloy powder is 0 to 70%.

Preferably, the volume fraction of the tungsten powder in the total volume of the tungsten powder and the amorphous alloy powder is 0 to 50%.

Preferably, the volume fraction of the tungsten powder in the total volume of the tungsten powder and the amorphous alloy powder is 20 to 50%.

Preferably, the tungsten powder has an average particle size of 10 μm to 100 μm, and the amorphous alloy powder has an average particle size of 30 μm to 80 μm.

Preferably, the binder is silica sol, polyvinyl alcohol or maltodextrin. The mass of the binder is 6% to 10% of the mass of the amorphous alloy powder; and the bonding layer has a thickness of 0.015 mm to 0.1 mm.

Preferably, the binder is silica sol.

Preferably, the double-drum type powder feeding device includes powder storage hoppers, powder tanks and drums; the tungsten powder and the amorphous alloy powder respectively fall from the respective powder storage hoppers into corresponding lower powder tanks, and the dynamic equilibrium of the powder accumulation within a certain range is maintained by the atmospheric pressure and the gas pressure in the powder tanks; the drums rotate at a constant speed and the powder scoops evenly distributed thereon continuously draw the powders from the respective powder tanks and pour the powders from the other side, so that the powders are fed out from the respective powder outlets due to gravity; the powder feeding rate is controlled by adjusting the rotating speed of the drums and changing powder spoons with different sizes.

Preferably, in the preforming process by micro-jetting and bonding, through a double-drum type powder feeding device, successively spraying the amorphous alloy powder and the tungsten powder by double nozzles, i.e., spraying the amorphous alloy powder first and then spraying the tungsten powder, and then spraying the binder to bond the powders into a bonding layer; repeating the operations of successively spraying the powders by the double nozzles, i.e., spraying the amorphous alloy powder first and then spraying the tungsten powder, and then spraying the binder, so as to print a preform composed of multiple bonding layers.

Preferably, the capsule is made of stainless steel or nickel material, and has a thickness of 0.5 mm to 2 mm.

Preferably, the holding time of the capsule in the heating furnace is 5 min to 20 min, during which a vacuumizing pipe of the capsule is connected to a vacuum pump, and after vacuumizing, the vacuumizing pipe is heated with oxyhydrogen flame, and then pinched off by a hydraulic clamp when it is red hot to seal the capsule.

Preferably, the hot isostatic pressing sintering forming is carried out with an inert gas as a pressure transmitting medium.

Preferably, the amorphous alloy powder is prepared by a vacuum gas atomization method.

Preferably, a powder outlet of the double-drum type powder feeding device is connected to a powder inlet of the double nozzles.

Preferably, the inert gas is nitrogen or argon.

In general, compared with the prior art, the present invention has the following beneficial effects:

(1) in the present invention, the proposed preparation method of tungsten particle reinforced amorphous matrix composites combines the micro-jetting and bonding 3D printing technology and the hot isostatic pressing sintering forming technology, in which the amorphous alloy powder and the tungsten powder are first printed into a preform by the micro-jetting and bonding 3D printing technology, then the preform is placed in a capsule, heating and vacuumizing are performed on the capsule a heating furnace to discharge air generated by gasification or decomposition of the binder in the preform body due to heat, the capsule is sealed and then subjected to hot press forming in a hot isostatic pressing sintering furnace so as to obtain an amorphous matrix composite. The organic combination of the additive 3D printing technology and hot isostatic pressing sintering forming makes it possible to manufacture a large-size amorphous matrix composite in which a high content of small particle reinforcing phase is uniformly distributed.

(2) tungsten particle reinforced amorphous matrix composites prepared by using conventional methods such as infiltration, water quenching, or copper die casting are severely limited in size, while the 3D printing technology can overcome the size limitation and produce a preform of amorphous matrix composite with larger size. Therefore, in the present invention, the amorphous alloy powder and the tungsten powder are first printed into a preform by the micro-jetting and bonding 3D printing technology, and then hot isostatic pressing sintering forming is performed on the preform in the second step, so that a large-sized amorphous matrix composite can be prepared.

(3) the traditional preparation methods of tungsten particle reinforced amorphous matrix composites, such as stirring casting and melting casting, are not suitable for materials with large differences in matrix and reinforcing phase densities. For example, the $Zr_{55}Cu_{30}Ni_5Al_{10}$ amorphous alloy powder has only a density of 6.82 g/cm$^3$, while the tungsten powder has a density of 19.25 g/cm$^3$, and thus, the large density difference makes it difficult to obtain a dense tungsten particle reinforced amorphous matrix composite with uniform particle phase distribution. Further, in the water quenching method, it is required that powder mixing is performed before forming, but the powders are difficult to be mixed uniformly through a traditional powder mixing method adopting a ball mill, due to their large differences in particle size and density and the like (stratification may occur after standing of a short time). In addition, in the infiltration method, it is required that skeleton preparing by the sintering method is performed before forming, but the tungsten particles may aggregate into particle clusters in the skeleton preparing process, resulting in the inability of the particle phase to be uniformly and dispersedly distributed in the amorphous matrix. However, in the present invention, the problem of non-uniform powder mixing is effectively overcome by means of the double-drum type powder feeding device and the micro-jetting and bonding forming technology. Compared with the traditional powder mixing method adopting a ball mill, the use of a double-drum type powder feeding device can effectively regulate the powder content, in which powders are successively sprayed by double nozzles (the anterior nozzle sprays amorphous alloy powder with small density and the posterior nozzle sprays tungsten powder with large density), and then the binder is sprayed, so that each layer of tungsten powder can be uniformly and dispersedly distributed in the amorphous matrix.

(4) compared with preforming by the hot additive manufacturing technology such as selective laser sintering or cladding, in the present invention, preforming is carried out by the micro-jetting and bonding forming method without a laser, which reduces the forming cost and improves the forming speed and material utilization rate. In addition, the preforming can be performed at room temperature and support is not required in the forming process. Meanwhile, problems such as crystallization caused by heat-affected zone due to heat, warping deformation or cracking due to thermal stress are effectively avoided in the preforming process.

(5) in the present invention, air generated by gasification or decomposition of the binder in the preform body due to heat can be discharged by vacuumizing the capsule in a heating furnace, and meanwhile, the capsule shrinks to compact the preform body, ensuring that the internal structure of the preform body does not change, and thus hot isostatic pressing is not affected.

(6) in the present invention, hot isostatic pressing sintering forming is adopted, in which by using the inert gas as the pressure-transmitting medium, pressure can be uniformly applied in different directions of the capsule, and compared with other one-way forced forming modes, hot isostatic pressing sintering forming features better formability, more dense internal structure, and more uniform particle phase distribution, and a large-size amorphous matrix composite having no macro-segregation and almost no void and crack defects can be prepared at a lower sintering temperature.

BRIEF DESCRIPTION OF THE DRAWINGS

In all figures, the same elements or structures are denoted by the same reference numerals, in which.

Figure 1:
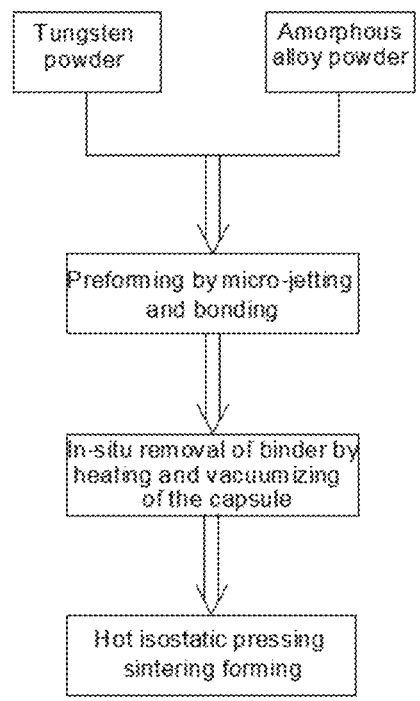
FIG. 1 is a flowchart of a method according embodiments of the present invention.

1: amorphous alloy powder storage hopper, 2: amorphous alloy powder tank, 3: amorphous alloy powder, 4: drum, 5: amorphous alloy powder outlet, 6: tungsten powder storage hopper, 7: tungsten powder tank, 8: tungsten powder, 9: powder spoon, 10: tungsten powder outlet, 11: binder nozzle, 12: preform, 13: forming cylinder piston, 14: amorphous alloy powder nozzle, 15: tungsten powder nozzle, 16: forming cylinder, 17: vacuumizing pipe, 18: capsule, 19: heater, 20: thermocouple, 21: heating furnace, 22: air inlet, 23: high-pressure vacuum cylinder.

DETAILED DESCRIPTION OF THE PREFERRED EMBODIMENTS

For clear understanding of the objectives, features and advantages of the invention, detailed description of the invention will be given below in conjunction with accompanying drawings and specific embodiments. It should be noted that the embodiments described herein are only meant to explain the invention, and not to limit the scope of the invention.

The present invention provides a preparation method of tungsten particle reinforced amorphous matrix composites, comprising the following steps:

(1) Making tungsten powder and amorphous alloy powder into a preform by the micro-jetting and bonding 3D printing technology, specifically comprising: in the preforming process by micro-jetting and bonding, through a double-drum type powder feeding device, spraying tungsten powder and amorphous alloy powder into a layer of uniformly mixed powder layer by double nozzles, then bonding the powder layer into a bonding layer with a thickness of 0.015 mm to 0.1 mm by the binder, and repeating the operations of spraying the powders and binder, so that a preform with uniform particle phase distribution is finally prepared The selection criteria of the amorphous alloy are: strong amorphous forming ability, good thermostability and good thermoplastic forming property, in which the strong amorphous forming ability indicates that the amorphous formation critical size of the amorphous alloy is not less than 10 mm; the good thermostability indicates that the supercooled liquid phase interval $\Delta T_x$ is larger than 50K ($\Delta T_x = T_x - T_g = 80K$, where $T_g$ represents a glass transition temperature and $T_x$ represents an initial crystallization temperature); and the good thermoplastic forming property indicates that the thermoplastic forming capability index S>0.15 ($S = \Delta T_x/(T_L - T_g) = 0.167$ where $T_L$ represents a liquidus temperature). The amorphous alloys may be, for example, Zr-based amorphous alloy and Cu-based amorphous alloy.

The tungsten powder has a volume fraction of 0 to 50%. In addition, the tungsten powder has an average particle size of 10 μm to 100 μm, and the amorphous alloy powder has an average particle size of 30 μm to 80 μm, and is preferably prepared by a vacuum gas atomization method, since the amorphous alloy powder prepared by the vacuum gas atomization method has good sphericity, uniform composition and uniform particle size distribution. The binder may be silica sol, polyvinyl alcohol or maltodextrin, and is preferably silica sol; and the mass of the binder is 6% to 10% of the mass of the amorphous alloy powder.

In the preforming process by micro-jetting and bonding, a double-drum type powder feeding device is used, which includes powder storage hoppers, powder tanks and powder feeding drums. The powders fall from the respective powder storage hoppers into the respective lower powder tanks, and the dynamic equilibrium of the powder accumulation within a certain range is maintained by the atmospheric pressure and the gas pressure in the powder tanks. The drums rotate at a constant speed and the powder scoops evenly distributed thereon continuously draw the powder from the powder tank and pour the powders from the other side, so that the powders are fed out from the respective powder outlets due to gravity. The powder feeding rate may be controlled by adjusting the rotating speed of the drums and changing powder spoons with different sizes.

(2) Placing the preform in the step (1) in a capsule, and performing heating, heat preservation and vacuumizing on the capsule in a heating furnace, in which the heating temperature in the heating furnace is higher than a boiling point temperature of the binder in the step (1) and lower than a glass transition temperature of the matrix preform body of amorphous alloy and a melting point temperature of the capsule, so that air generated by gasification or decomposition of the binder due to heat is discharged by vacuumizing.

The material of the capsule should meet the following conditions: it has absolutely reliable airtightness, proper strength and good plasticity and thermal conductivity, does not react with the contained content, and is easy to be processed and peeled off. For example, the capsule may be made of stainless steel or nickel material and have a thickness of 0.5 mm to 2 mm. The holding time of the capsule in the heating furnace is 5 min to 20 min, during which a vacuumizing pipe of the capsule is connected to a high vacuum pump, and after vacuumizing, the vacuumizing pipe is heated with oxyhydrogen flame, and then pinched off by a hydraulic clamp when it is red hot to seal the capsule.

(3) Placing the capsule in the step (2) in the hot isostatic pressing sintering furnace and performing hot press forming to obtain an amorphous matrix composite, in which the hot isostatic pressure sintering temperature is between the glass transition temperature $T_g$ and the initial crystallization temperature $T_x$ of the amorphous alloy, and the hot isostatic pressing sintering forming time is shorter than the crystallization starting time of the amorphous alloy at the employed hot isostatic pressing sintering temperature. The crystallization starting time can be measured by the isothermal DSC experiment. The material of the capsule should meet the following conditions: it has absolutely reliable airtightness, proper strength and good plasticity and thermal conductivity, does not react with the contained content, and is easy to be processed and peeled off. For example, the capsule may be made of stainless steel or nickel material.

The hot press forming is carried out with the inert gas (i.e., nitrogen or argon) as the pressure transmitting medium to avoid oxidation. By selecting appropriate hot press parameters such as forming temperature and forming time, the matrix of the formed amorphous matrix composite still has a completely amorphous structure.

The invention belongs to the fields of amorphous alloy composites, additive manufacturing technology and hot isostatic pressing sintering forming, and in particular relates to a preparation method of tungsten particle reinforced amorphous matrix composites. An amorphous alloy preform is prepared by the micro-jetting and bonding forming method, and then the preform is placed in the hot isostatic pressing sintering furnace for hot press forming. By selecting appropriate hot press parameters such as forming temperature and forming time, the matrix of the formed amorphous matrix composite still has a completely amorphous structure.

In the present invention, the powder content can be effectively regulated by utilizing a double-drum type powder feeding device, in which powders are successively sprayed by double nozzles (the anterior nozzle sprays amorphous alloy powder with small density and the posterior nozzle sprays tungsten powder with large density), and then the binder is sprayed such that each layer of tungsten powder can be uniformly and dispersedly distributed in the amorphous matrix. By contrast, in the traditional methods for preparing tungsten particle reinforced amorphous matrix composites, powder mixing or skeleton preparing by the sintering method is performed before forming, which results in that the tungsten powder and the amorphous alloy powder are difficult to be mixed uniformly due to their large differences in particle size and density and the like (stratification may occur after standing of a short time), or that the tungsten particles may aggregate into particle clusters in the skeleton preparing process, resulting in the inability of the particle phase to be uniformly and dispersedly distributed in the amorphous matrix. However, in the present invention, the problem of non-uniform powder mixing is effectively overcome by means of the double-drum type powder feeding device and the micro-jetting and bonding forming technology. Compared with the traditional powder mixing method adopting a ball mill, the use of a double-drum type powder feeding device can effectively regulate the powder content, in which powders are successively sprayed by double nozzles (the anterior nozzle sprays amorphous alloy powder with small density and the posterior nozzle sprays tungsten powder with large density), and then the binder is sprayed, so that each layer of tungsten powder can be uniformly and dispersedly distributed in the amorphous matrix.

Compared with preforming by selective laser sintering or cladding, in the present invention, preforming is carried out by the micro-jetting and bonding forming method without a laser, which reduces the forming cost and improves the forming speed and material utilization rate. In addition, the preforming can be performed at room temperature and support is not required in the forming process. Meanwhile, problems such as crystallization caused by heat-affected zone due to heat, warping deformation or cracking due to thermal stress are effectively avoided in the preforming process.

In the present invention, air generated by gasification or decomposition of the binder in the preform body due to heat can be discharged by vacuumizing the capsule in a heating furnace, and meanwhile, the capsule shrinks to compact the preform body, ensuring that the internal structure of the preform body does not change, and thus hot isostatic pressing is not affected.

During the hot isostatic pressing process, due to heat, the binder in the 3D printed preform contained in the capsule may be gasified or decomposed into gas, and if there is air inside the capsule, bubbles with large pressure will be formed under the action of high pressure. After the external pressure is released, these bubbles with large pressure will expand outward due to the pressure difference, which not only leads to defects in the formed part, but also may cause explosion. Therefore, the capsule should be vacuumized before hot isostatic pressing. During the vacuumizing process, in order to make the vacuumizing more efficient and thorough, the vacuumizing of the capsule is carried out during the holding process, in which the holding temperature is higher than the boiling point temperature of the binder and lower than the glass transition temperature of the matrix preform body of amorphous alloy and the melting temperature of the capsule. When the vacuum degree indicating value is stable at $10^{-3}$ for a long time, it can be considered that the vacuumizing process is completed, and air generated by gasification or decomposition of the binder at the holding temperature in the heating furnace has been completely discharged by vacuumizing. Then, pinch-off operation and seal welding are performed on the connection pipe of the capsule, and thus, the preparation process of the test piece for hot isostatic pressure is completed. In the hot isostatic pressing sintering forming process, by using the inert gas as the pressure-transmitting medium, pressure can be uniformly applied in different directions of the capsule, so that a large-size amorphous matrix composite having no macro-segregation and almost no void and crack defects can be prepared at a lower sintering temperature.

In the present invention, hot isostatic pressing sintering forming is adopted, in which by using the inert gas as the pressure-transmitting medium, pressure can be uniformly applied in different directions of the capsule, and compared with other one-way forced forming modes, hot isostatic pressing sintering forming features better formability, more dense internal structure, and more uniform particle phase distribution, and a large-size amorphous matrix composite having no macro-segregation and almost no void and crack defects can be prepared at a lower sintering temperature.

By combining the forming characteristics of the amorphous alloy (requiring rapid forming in a suitable temperature range, i.e., a short forming time), the present invention proposes utilizing the cold additive micro-jetting and bonding technology to mix powders, and this cold operation not only does not take up the amorphous forming time, but also achieves the uniform mixing of the tungsten powder and the amorphous alloy powder which have large difference in particle density through a specific double-drum type powder feeding device in combination with simultaneous powder spraying by double nozzles, and meanwhile, the relative position of the two powders is fixed by means of the binder. Then, heating, heat preservation and vacuumizing are performed on the capsule to achieve in-situ removal of the binder, and the powder mixture is compacted when the capsule shrinks so that the powder mixture still keeps a good uniform distribution state. Subsequently, hot pressing sintering forming is performed on the compacted powder mixture by the hot isostatic pressing sintering technology to prepare an amorphous matrix composite. In the preparation method for the amorphous matrix composite in the present invention, three steps, i.e., preforming by the cold additive micro-jetting and bonding technology, in-situ removal of the binder by heating and vacuumizing of the capsule and hot isostatic pressing sintering forming, are combined to ensure that during the preparation process of the amorphous composite, the tungsten particles (i.e., the reinforcing phase) are always uniformly dispersed in the amorphous alloy, so that an amorphous matrix composite in which tungsten particles are uniformly distributed can be finally obtained. The organic combination of the micro-jetting and bonding technology, in-situ removal of binder and hot isostatic pressing sintering forming makes it possible to manufacture a tungsten particle reinforced amorphous matrix composite with large size and uniform particle phase distribution.

The present invention is further described in conjunction with embodiments below.

Embodiment 1

In the present embodiment, a tungsten reinforced Zr-based amorphous alloy composite with a volume fraction of tungsten of 20% is prepared. FIG. 1 is a flowchart of a method according preferred embodiments of the present invention. As shown in FIG. 1, a preparation method of tungsten particle reinforced amorphous matrix composites comprises the following steps:

Step (1): Preforming by the Micro-Jetting and Bonding Technology

Figure 2:
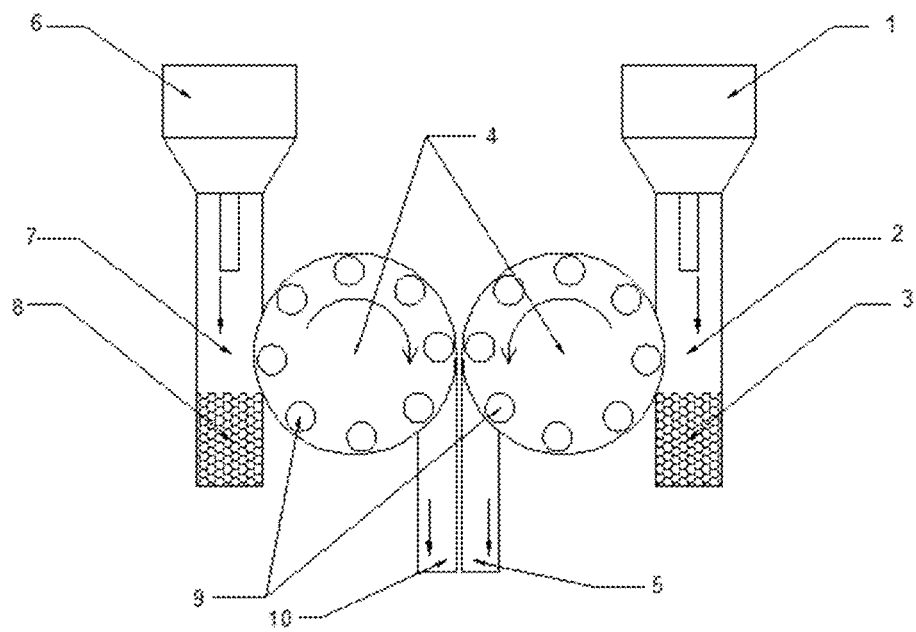
FIG. 2 is a structural schematic diagram of a double-drum type powder feeding device according the embodiments of the present invention.
Figure 3:
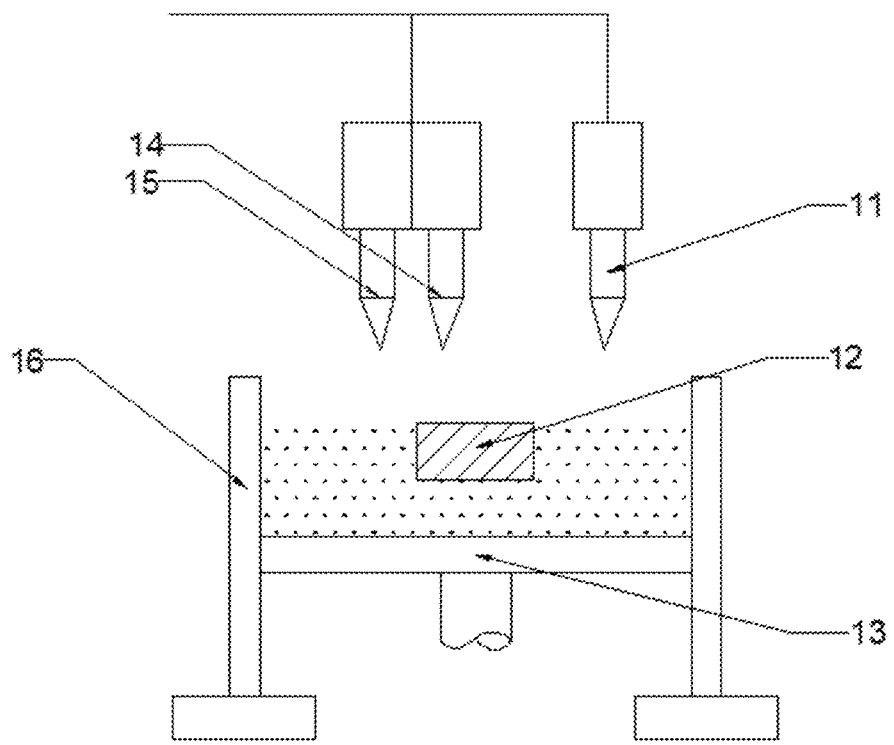
FIG. 3 is a structural schematic diagram of a device for the micro-jetting and bonding technology according the embodiments of the present invention.

Structural schematic diagrams of a double-drum type powder feeding device and a device for the micro-jetting and bonding technology are respectively showed in FIGS. 2-3.

The specific process is as follows:

Tungsten powder with an average particle size of 30 μm prepared by a vacuum gas atomization method and $Zr_{55}Cu_{30}Ni_5Al_{10}$ amorphous alloy powder are selected to prepare a preform. The $Zr_{55}Cu_{30}Ni_5Al_{10}$ amorphous alloy has an amorphous formation critical size of more than 20 mm, a glass transition temperature $T_g$ of 685K, an initial crystallization temperature $T_x$ of 765K and a liquidus temperature $T_L$ of 1164K. Therefore, this amorphous alloy has a supercooled liquid phase interval $\Delta T_x = T_x - T_g = 80K$ and a thermoplastic forming capability index $S = \Delta T_x / (T_L - T_g) = 0.167$, and thus has a good amorphous forming ability.

The structural schematic diagram of the double-drum type powder feeding device is showed in FIG. 2. The tungsten powder and $Zr_{55}Cu_{30}Ni_5Al_{10}$ amorphous alloy powder are respectively put into powder storage hoppers 6 and 1, the tungsten powder falls from the powder storage hopper 6 into a lower powder tank 7, the amorphous alloy powder falls from the powder storage hopper 1 into a lower powder tank 2, and the dynamic equilibrium of the powder accumulation within a certain range is maintained by the atmospheric pressure and the gas pressure in the powder tanks. The drum 4 rotates at a constant speed, and the powder scoops 9 evenly distributed thereon continuously draw the powder 8 or 3 from the powder tank and pour the powder from the other side, so that the powder 8 or 3 is fed out from the powder outlet 10 or 5 due to gravity. The powder feeding rate may be controlled by adjusting the rotating speed of the drums 4 and changing powder spoons 9 with different sizes.

Then, double nozzles (i.e., an amorphous alloy powder nozzle 14 and a tungsten powder nozzle 15) successively spray the amorphous alloy powder and the tungsten powder into a layer of powder in the forming cylinder 16 uniformly, and then the binder nozzle 11 sprays the silica sol binder on the pre-laid tungsten powder and amorphous alloy powder to form a bonding layer with a thickness of 0.05 mm. After the previous bonding layer is formed, the forming cylinder piston 13 is lowered by 0.05 mm. Under the control of the computer, the tungsten powder, amorphous alloy powder and binder are selectively sprayed according to forming data of the next build section to build a bonding layer. The above process is repeated, and the powders and the binder are continuously sprayed until a perform 12 is three-dimensionally printed.

Figure 4:
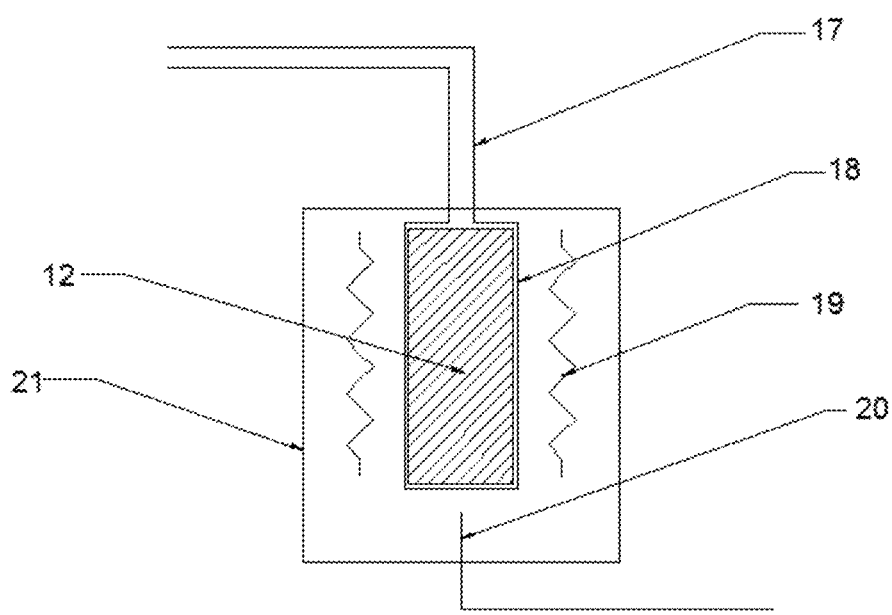
FIG. 4 is a structural schematic diagram of a heating furnace and a vacuumizing device according the embodiments of the present invention.

Step (2): Performing In-Situ Removal of the Binder by Heating and Vacuumizing of the Capsule A structural schematic diagram of a heating furnace and a vacuumizing device is shown in FIG. 4.

The selected capsule is made of stainless steel and has a thickness of 1 mm. the perform 12 in the step (1) is placed in the capsule 18, and then the capsule 18 is put into a heating furnace 21, heated by a heater 19 and held at 300° C. for 10 minutes. Meanwhile, a high vacuum pump is connected to the vacuumizing pipe 17 to perform vacuuming and discharge the air generated by gasification or decomposition of the binder due to heat. After vacuumizing, the vacuumizing pipe is heated with oxyhydrogen flame, and then pinched off by a hydraulic clamp when it is red hot to seal the capsule.

Step (3): Hot Isostatic Pressing Sintering Forming

Figure 5:
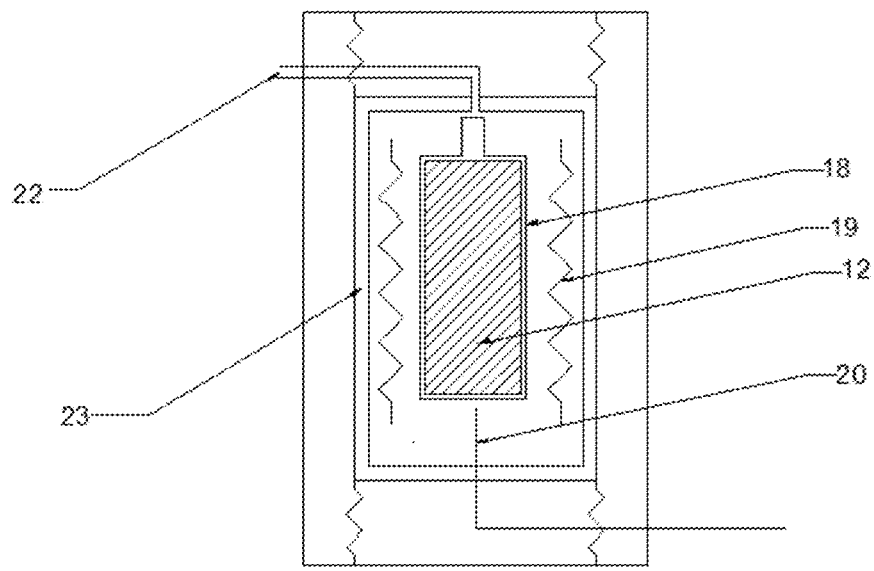
FIG. 5 is a structural schematic diagram showing hot isostatic pressing sintering according the embodiments of the present invention.

A schematic diagram of hot isostatic pressing sintering forming is shown in FIG. 5.

The capsule 18 in the step (2) is placed in a hot isostatic pressing sintering furnace, the high pressure vacuum cylinder 23 is vacuumized, and then argon is filled through an air inlet 22, and it is heated to 730K by the heater 19 and then held for 7 min with a sintering pressure of 120 MPa. According to the isothermal DSC experiment, crystallization does not occur in the $Zr_{55}Cu_{30}Ni_5Al_{10}$ amorphous alloy at 730K for 8 min. Therefore, in the present embodiment, a tungsten particle reinforced Zr-based amorphous alloy composite having a large size, uniform particle phase distribution, and a completely amorphous structure and containing a volume fraction of tungsten of 20% can be obtained by using the above method and devices.

Figure 6:
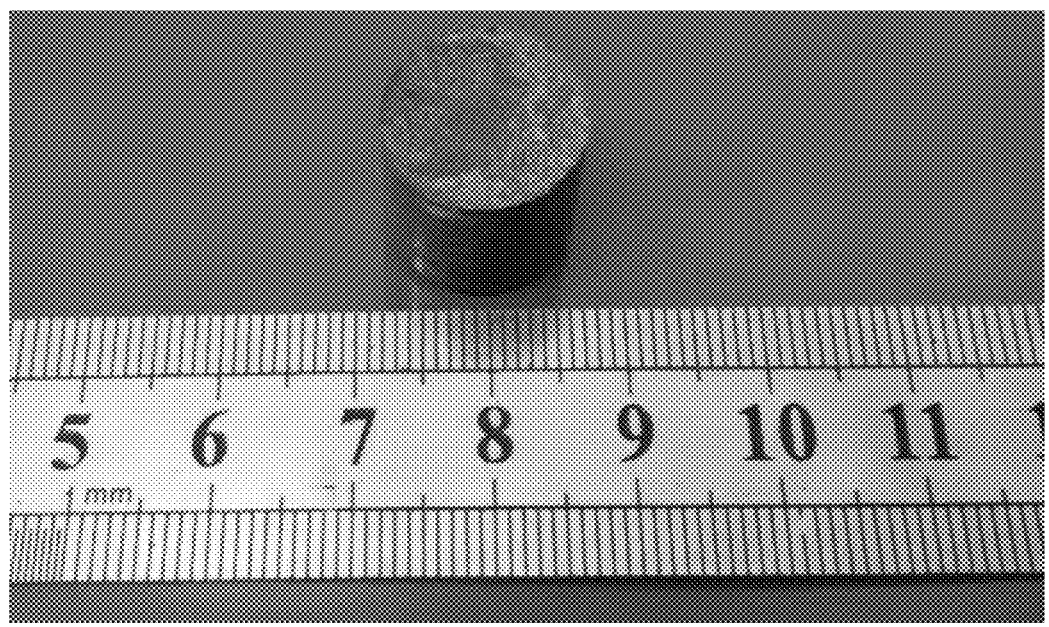
FIG. 6 shows a photo of a tungsten particle reinforced Zr-based amorphous alloy composite with a volume fraction of tungsten of 20% prepared by hot isostatic pressing sintering forming according an embodiment 1 of the present invention.

FIG. 6 shows a photo of a tungsten particle reinforced Zr-based amorphous alloy composite with a volume fraction of tungsten of 20% prepared by hot isostatic pressing sintering forming according to the present embodiment.

Figure 9:
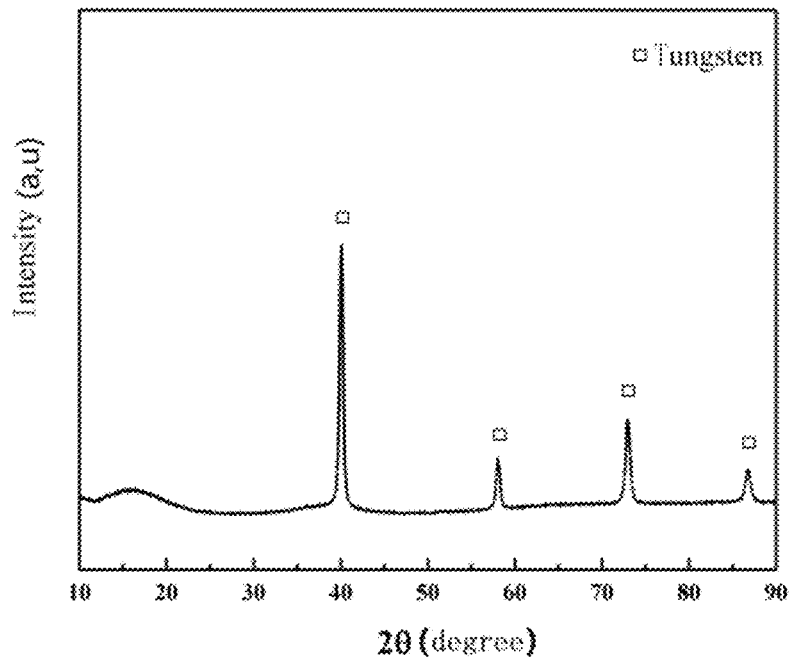
FIG. 9 is an XRD pattern of the tungsten particle reinforced Zr-based amorphous alloy composite with a volume fraction of tungsten of 20% according the embodiment 1 of the present invention.

FIG. 9 is an XRD pattern of the tungsten particle reinforced Zr-based amorphous alloy composite with a volume fraction of tungsten of 20% according to the present embodiment. It can be seen from FIG. 9 that only crystallization peaks corresponding to the tungsten particles appear, and no other crystallization peaks are found, indicating that the matrix of the composite has a completely amorphous structure.

Figure 12:
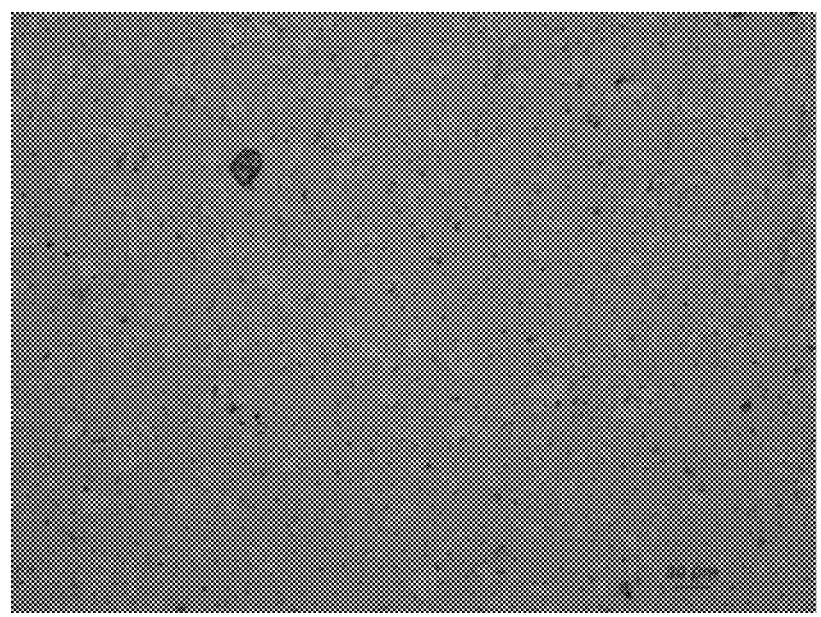
FIG. 12 shows the microstructure of the tungsten particle reinforced Zr-based amorphous alloy composite with a volume fraction of tungsten of 20% according the embodiment 1 of the present invention.

FIG. 12 shows the microstructure of the tungsten particle reinforced Zr-based amorphous alloy composite with a volume fraction of tungsten of 20% according to the present embodiment. It can be seen from FIG. 12 that 30 μm reinforcing phase (i.e., tungsten particles) with good sphericity is evenly distributed in the $Zr_{55}Cu_{30}Ni_5Al_{10}$ matrix.

Embodiment 2

In the present embodiment, a tungsten reinforced Zr-based amorphous alloy composite with a volume fraction of tungsten of 40% is prepared. FIG. 1 is a flowchart of a method according preferred embodiments of the present invention. As shown in FIG. 1, a tungsten particle reinforced amorphous matrix composite comprises the following steps:

Step (1): Preforming by Micro-Jetting and Bonding

Structural schematic diagrams of a double-drum type powder feeding device and a device for the micro-jetting and bonding technology are respectively showed in FIGS. 2-3.

The specific process is as follows:

Tungsten powder with an average particle size of 30 μm prepared by a vacuum gas atomization method and $Zr_{55}Cu_{30}Ni_5Al_{10}$ amorphous alloy powder are selected to prepare a preform. The $Zr_{55}Cu_{30}Ni_5Al_{10}$ amorphous alloy has an amorphous formation critical size of more than 20 mm, a glass transition temperature $T_g$ of 685K, an initial crystallization temperature $T_x$ of 765K and a liquidus temperature $T_L$ of 1164K. Therefore, this amorphous alloy has a supercooled liquid phase interval $\Delta T_x = T_x - T_g = 80K$ and a thermoplastic forming capability index $S = \Delta T_x/(T_L - T_g) = 0.167$, and thus has a good amorphous forming ability.

The tungsten powder and $Zr_{55}Cu_{30}Ni_5Al_{10}$ amorphous alloy powder are respectively put into powder storage hoppers 6 and 1, the tungsten powder falls from the powder storage hopper 6 into a lower powder tank 7, the amorphous alloy powder falls from the powder storage hopper 1 into a lower powder tank 2, and the dynamic equilibrium of the powder accumulation within a certain range is maintained by the atmospheric pressure and the gas pressure in the powder tanks. The drum 4 rotates at a constant speed and the powder scoops 9 evenly distributed thereon continuously draw the powder 8 or 3 from the powder tank and pour the powder from the other side, so that the powder 8 or 3 is fed out from the powder outlet 10 or 5 due to gravity. The powder feeding rate may be controlled by adjusting the rotating speed of the drums 4 and changing powder spoons 9 with different sizes.

Then, double nozzles (i.e., an amorphous alloy powder nozzle 14 and a tungsten powder nozzle 15) successively spray the amorphous alloy powder and the tungsten powder into a layer of powder in the forming cylinder 16 uniformly, and then the binder nozzle 11 sprays the silica sol binder on the pre-laid tungsten powder and amorphous alloy powder to form a bonding layer with a thickness of 0.05 mm. After the previous bonding layer is formed, the forming cylinder piston 13 is lowered by 0.05 mm. Under the control of the computer, the tungsten powder, amorphous alloy powder and binder are selectively sprayed according to forming data of the next build section to build a bonding layer. The above process is repeated, and the powders and the binder are continuously sprayed, until a perform 12 is three-dimensionally printed.

Step (2): performing in-situ removal of the binder by heating and vacuumizing the capsule The selected capsule is made of stainless steel and has a thickness of 1 mm. the perform 12 in the step (1) is placed in the capsule 18, and then the capsule 18 is put into a heating furnace 21, heated by a heater 19 and held at 300□ for 10 minutes. Meanwhile, a high vacuum pump is connected to the vacuumizing pipe 17 to perform vacuuming and discharge the air generated by gasification or decomposition of the binder due to heat. After vacuumizing, the vacuumizing pipe is heated with oxyhydrogen flame, and then pinched off by a hydraulic clamp when it is red hot to seal the capsule.

Step (3): Hot Isostatic Pressing Sintering Forming

A schematic diagram of hot isostatic pressing sintering forming is shown in FIG. 5.

The capsule 18 in the step (2) is placed in a hot isostatic pressing sintering furnace, the high pressure vacuum cylinder 23 is vacuumized, and then argon is filled through an air inlet 22, and it is heated to 730K by the heater 19 and then held for 7 min with a sintering pressure of 120 MPa. According to the isothermal DSC experiment, crystallization does not occur in the $Zr_{55}Cu_{30}Ni_5Al_{10}$ amorphous alloy at 730K for 8 min. Therefore, in the present embodiment, a tungsten particle reinforced Zr-based amorphous alloy composite having a large size, uniform particle phase distribution, and a completely amorphous structure and containing a volume fraction of tungsten of 40% can be obtained by using the above method and devices.

Figure 7:
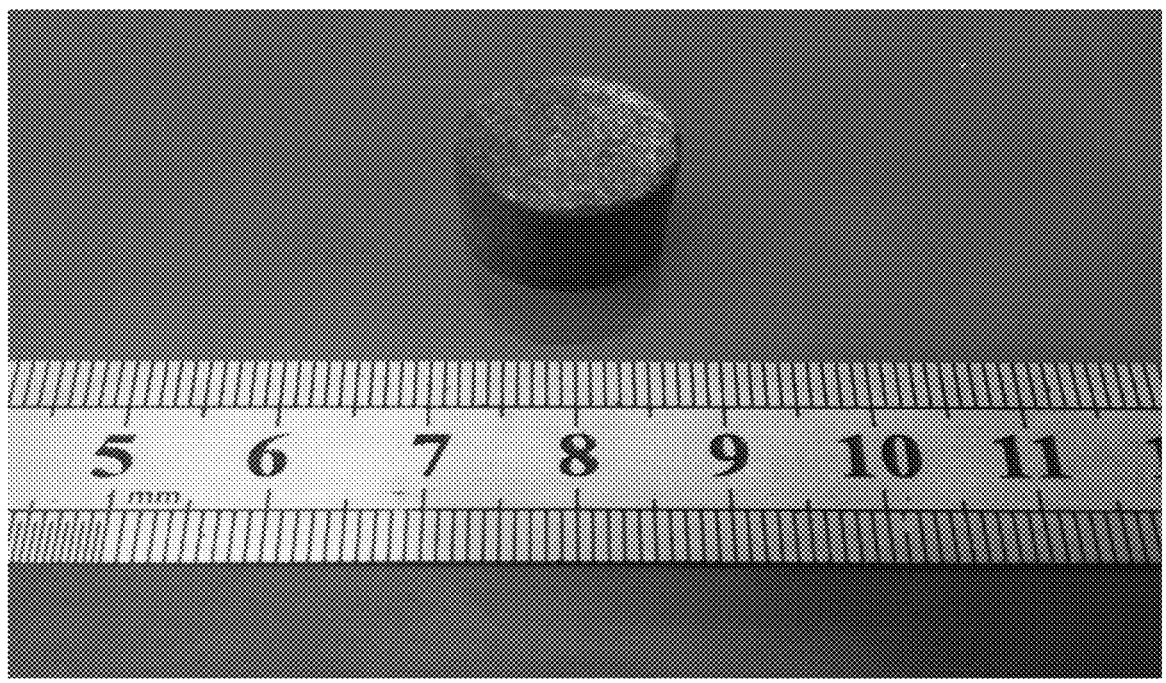
FIG. 7 shows a photo of a tungsten particle reinforced Zr-based amorphous alloy composite with a volume fraction of tungsten of 40% prepared by hot isostatic pressing sintering forming according an embodiment 2 of the present invention.

FIG. 7 shows a photo of a tungsten particle reinforced Zr-based amorphous alloy composite with a volume fraction of tungsten of 40% prepared by hot isostatic pressing sintering forming according to the present embodiment.

Figure 10:
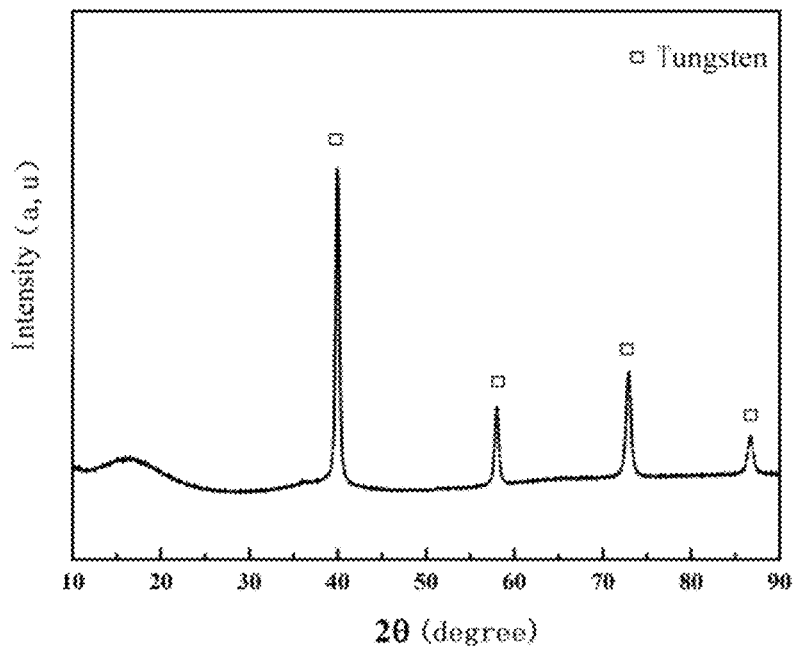
FIG. 10 is an XRD pattern of the tungsten particle reinforced Zr-based amorphous alloy composite with a volume fraction of tungsten of 40% according the embodiment 2 of the present invention.

FIG. 10 is an XRD pattern of the tungsten particle reinforced Zr-based amorphous alloy composite with a volume fraction of tungsten of 40% prepared by hot isostatic pressing sintering forming according to the present embodiment. It can be seen from FIG. 10 that only crystallization peaks corresponding to the tungsten particles appear, and no other crystallization peaks are found, indicating that the matrix of the composite has a completely amorphous structure.

Figure 13:
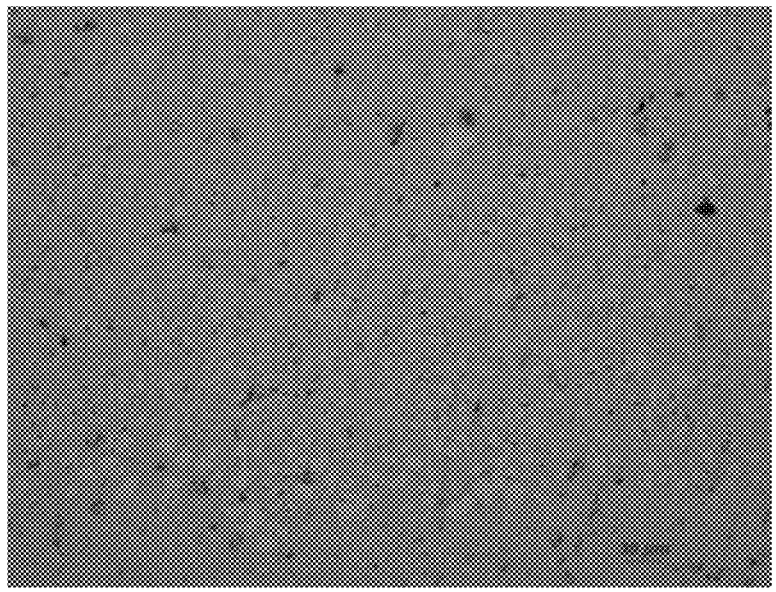
FIG. 13 shows the microstructure of the tungsten particle reinforced Zr-based amorphous alloy composite with a volume fraction of tungsten of 40% according the embodiment 2 of the present invention.

FIG. 13 shows the microstructure of the tungsten particle reinforced Zr-based amorphous alloy composite with a volume fraction of tungsten of 40% prepared by hot isostatic pressing sintering forming according to the present embodiment. It can be seen from FIG. 13 that 30 μm reinforcing phase (i.e., tungsten particles) with good sphericity is evenly distributed in the $Zr_{55}Cu_{30}Ni_5Al_{10}$ matrix.

Embodiment 3

In the present embodiment, a tungsten reinforced Zr-based amorphous alloy composite with a volume fraction of tungsten of 50% is prepared. FIG. 1 is a flowchart of a method according preferred embodiments of the present invention. As shown in FIG. 1, a tungsten particle reinforced amorphous matrix composite comprises the following steps:

Step (1): Preforming by Micro-Jetting and Bonding

Structural schematic diagrams of a double-drum type powder feeding device and a device for the micro-jetting and bonding technology are respectively showed in FIGS. 2-3.

The specific process is as follows:

Tungsten powder with an average particle size of 30 μm prepared by a vacuum gas atomization method and $Zr_{55}Cu_{30}Ni_5Al_{10}$ amorphous alloy powder are selected to prepare a preform. The $Zr_{55}Cu_{30}Ni_5Al_{10}$ amorphous alloy has an amorphous formation critical size of more than 20 mm, a glass transition temperature $T_g$ of 685K, an initial crystallization temperature $T_x$ of 765K and a liquidus temperature $T_L$ of 1164K. Therefore, this amorphous alloy has a supercooled liquid phase interval $\Delta T_x=T_x-T_g=80K$ and a thermoplastic forming capability index $S=\Delta T_x/(T_L-T_g)=0.167$, and thus has a good amorphous forming ability.

The tungsten powder and $Zr_{55}Cu_{30}Ni_5Al_{10}$ amorphous alloy powder are respectively put into powder storage hoppers 6 and 1, the tungsten powder falls from the powder storage hopper 6 into a lower powder tank 7, the amorphous alloy powder falls from the powder storage hopper 1 into a lower powder tank 2, and the dynamic equilibrium of the powder accumulation within a certain range is maintained by the atmospheric pressure and the gas pressure in the powder tanks. The drum 4 rotates at a constant speed and the powder scoops 9 evenly distributed thereon continuously draw the powder 8 or 3 from the powder tank and pour the powder from the other side, so that the powder 8 or 3 is fed out from the powder outlet 10 or 5 due to gravity. The powder feeding rate may be controlled by adjusting the rotating speed of the drums 4 and changing powder spoons 9 with different sizes.

Then, double nozzles (i.e., an amorphous alloy powder nozzle 14 and a tungsten powder nozzle 15) successively spray the amorphous alloy powder and the tungsten powder into a layer of powder in the forming cylinder 16 uniformly, and then the binder nozzle 11 sprays the silica sol binder on the pre-laid tungsten powder and amorphous alloy powder to form a bonding layer with a thickness of 0.05 mm. After the previous bonding layer is formed, the forming cylinder piston 13 is lowered by 0.05 mm. Under the control of the computer, the tungsten powder, amorphous alloy powder and binder are selectively sprayed according to forming data of the next build section to build a bonding layer. The above process is repeated, and the powders and the binder are continuously sprayed, until a perform 12 is three-dimensionally printed.

Step (2): Performing In-Situ Removal of the Binder by Heating and Vacuumizing of the Capsule The selected capsule is made of stainless steel and has a thickness of 1 mm. As shown in FIG. 4, the perform 12 in the step (1) is placed in the capsule 18, and then the capsule 18 is put into a heating furnace 21, heated by a heater 19 and held at 300° C. for 10 minutes. Meanwhile, a high vacuum pump is connected to the vacuumizing pipe 17 to perform vacuuming and discharge the air generated by gasification or decomposition of the binder due to heat. After vacuumizing, the vacuumizing pipe is heated with oxyhydrogen flame, and then pinched off by a hydraulic clamp when it is red hot to seal the capsule.

Step (3): Hot Isostatic Pressing Sintering Forming

A schematic diagram of hot isostatic pressing sintering forming is shown in FIG. 5.

The capsule 18 in the step (2) is placed in a hot isostatic pressing sintering furnace, the high pressure vacuum cylinder 23 is vacuumized, and then argon is filled through an air inlet 22, and it is heated to 730K by the heater 19 and then held for 7 min with a sintering pressure of 120 MPa. According to the isothermal DSC experiment, crystallization does not occur in the $Zr_{55}Cu_{30}Ni_5Al_{10}$ amorphous alloy at 730K for 8 min. Therefore, in the present embodiment, a tungsten particle reinforced Zr-based amorphous alloy composite having a large size, uniform particle phase distribution, and a completely amorphous structure and containing a volume fraction of tungsten of 50% can be obtained by using the above method and devices.

Figure 8:
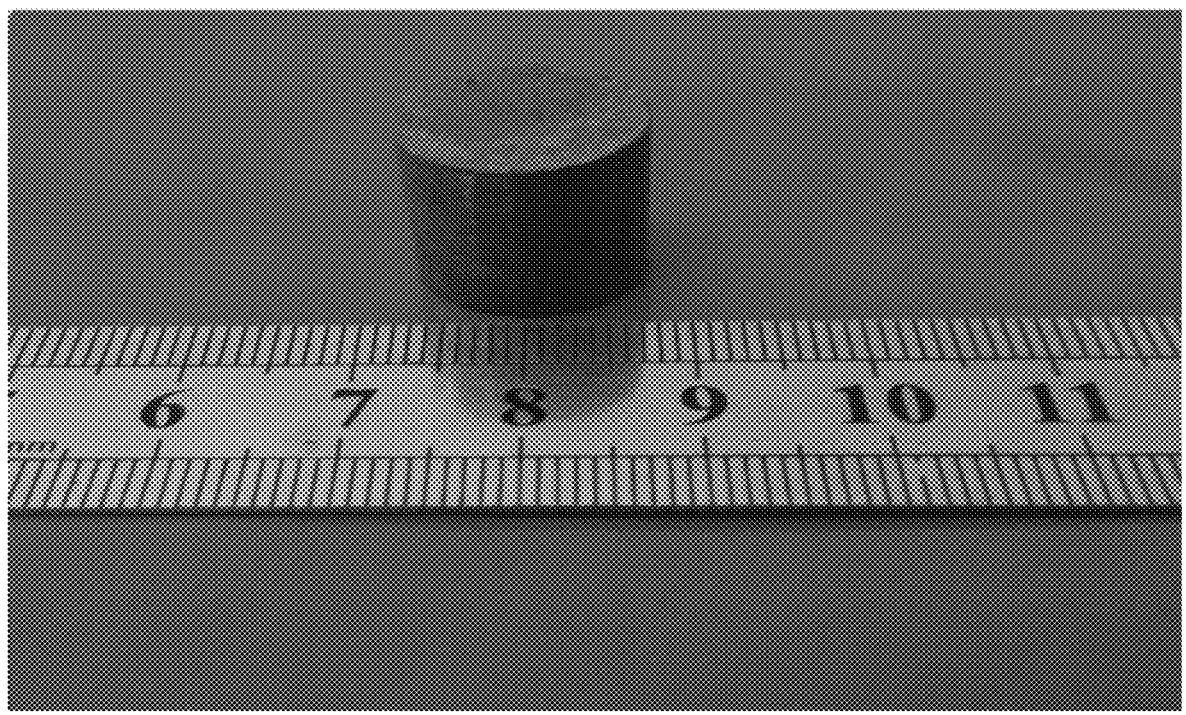
FIG. 8 shows a photo of a tungsten particle reinforced Zr-based amorphous alloy composite with a volume fraction of tungsten of 50% prepared by hot isostatic pressing sintering forming according an embodiment 3 of the present invention.

FIG. 8 shows a photo of a tungsten particle reinforced Zr-based amorphous alloy composite with a volume fraction of tungsten of 50% prepared by hot isostatic pressing sintering forming according to the present embodiment.

Figure 11:
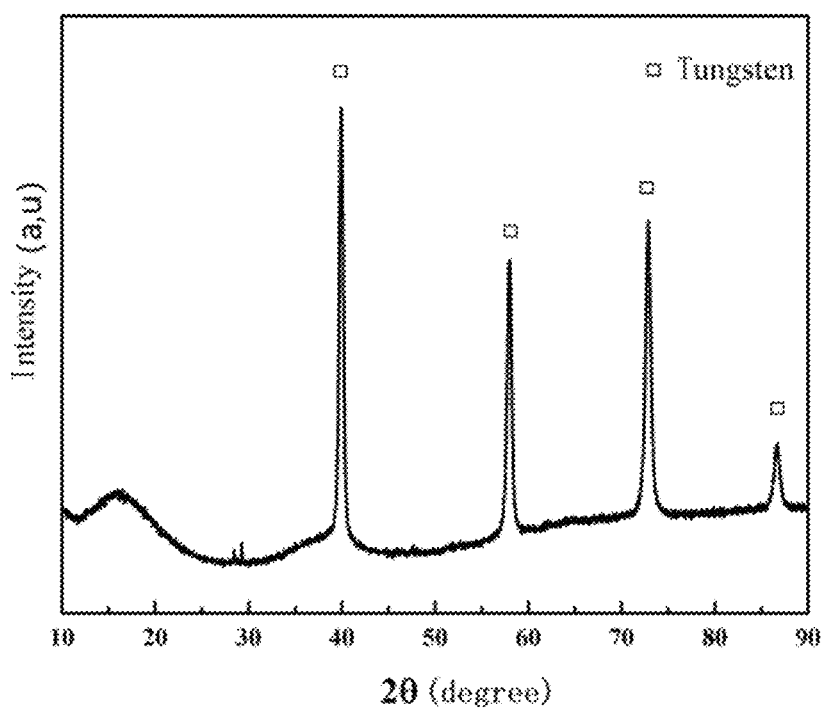
FIG. 11 is an XRD pattern of the tungsten particle reinforced Zr-based amorphous alloy composite with a volume fraction of tungsten of 50% according the embodiment 3 of the present invention.

FIG. 11 is an XRD pattern of the tungsten particle reinforced Zr-based amorphous alloy composite with a volume fraction of tungsten of 50% prepared by hot isostatic pressing sintering forming according to the present embodiment. It can be seen from FIG. 11 that only crystallization peaks corresponding to the tungsten particles appear, and no other crystallization peaks are found, indicating that the matrix of the composite has a completely amorphous structure.

Figure 14:
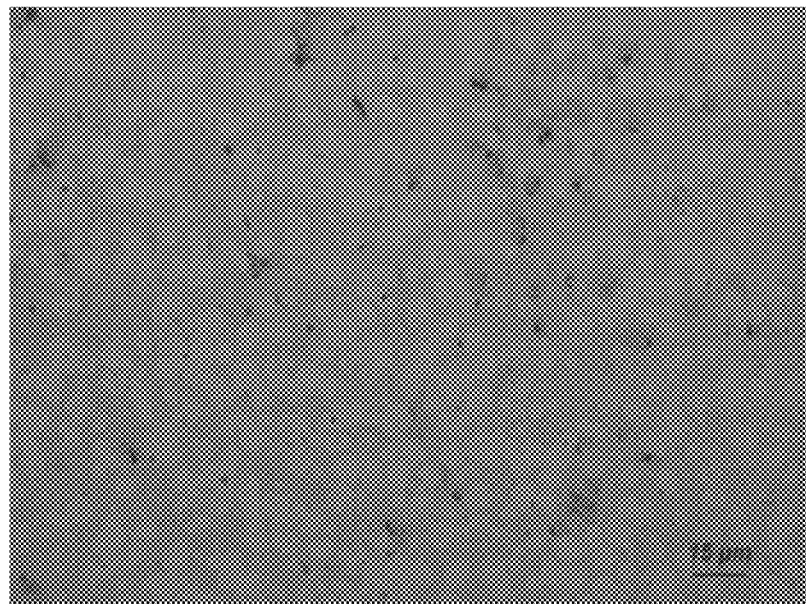
FIG. 14 shows the microstructure of the tungsten particle reinforced Zr-based amorphous alloy composite with a volume fraction of tungsten of 50% according the embodiment 3 of the present invention.

FIG. 14 shows the microstructure of the tungsten particle reinforced Zr-based amorphous alloy composite with a volume fraction of tungsten of 50% prepared by hot isostatic pressing sintering forming according to the present embodiment. It can be seen from FIG. 14 that 30 μm reinforcing phase (i.e., tungsten particles) with good sphericity is evenly distributed in the $Zr_{55}Cu_{30}Ni_5Al_{10}$ matrix.

While particular embodiments of the invention have been shown and described, it will be obvious to those skilled in the art that changes and modifications may be made without departing from the spirit and scope of the invention.

The invention claimed is:

1. A preparation method of a tungsten particle reinforced amorphous matrix composite, comprising the following steps:
 (1) making a preformed compact from a tungsten powder and an amorphous alloy powder by a micro-jetting and bonding 3D printing technique, wherein the step (1) comprises: through a double-drum type powder feeding device, successively spraying the amorphous alloy powder and the tungsten powder by double nozzles, then spraying a binder to bond the powders into a bonding layer, and repeating operations of successively spraying the powders and spraying the binder to print the preformed compact composed of multiple bonding layers;
 (2) placing the preformed compact obtained in the step (1) in a capsule, and heating, thermally insulating, and vacuumizing the capsule in a heating furnace, in which the heating temperature in the heating furnace is higher than a boiling point temperature of the binder and lower than a glass transition temperature of a matrix body of amorphous alloy and a melting point temperature of the capsule, so that the binder is gasified or decomposed into air and then discharged by vacuumizing;
 (3) placing the capsule in the step (2) in a hot isostatic pressure sintering furnace and performing hot press forming to obtain an amorphous matrix composite, in which the hot isostatic pressure sintering temperature is between a glass transition temperature $T_g$ and an initial crystallization temperature $T_x$ of the amorphous alloy, and the time for the hot isostatic pressure sintering and the hot press forming is shorter than the crystallization starting time of the amorphous alloy at the hot isostatic pressure sintering temperature.

2. The preparation method of claim 1, wherein an amorphous formation critical size of the amorphous alloy powder is not less than 10 mm, a supercooled liquid phase interval $\Delta T_x$, of the amorphous alloy powder is more than 50K, and a thermoplastic forming capability index S of the amorphous alloy powder is more than 0.15.

3. The preparation method of claim 1, wherein a volume fraction of the tungsten powder in the total volume of the tungsten powder and the amorphous alloy powder is up to 70%.

4. The preparation method of claim 1, wherein the tungsten powder has an average particle size of 10 μm to 100 μm, and the amorphous alloy powder has an average particle size of 30 μm to 80 μm.

5. The preparation method of claim 1, wherein the binder includes a silica sol, a polyvinyl alcohol, or a maltodextrin; a mass of the binder is 6% to 10% of the mass of the amorphous alloy powder; and the bonding layer has a thickness of 0.015 mm to 0.1 mm.

6. The preparation method of claim 1, wherein the double-drum type powder feeding device includes powder storage hoppers, powder tanks, and drums;
 the tungsten powder and the amorphous alloy powder respectively fall from respective powder storage hoppers into corresponding lower powder tanks, and a dynamic amount of powder accumulation within a certain range is maintained by an atmospheric pressure and a gas pressure in the powder tanks;
 the drums rotate at a constant speed and powder scoops evenly distributed thereon continuously draw powders from the respective powder tanks and pour the powders such that the powders are fed out from respective powder outlets due to gravity; the powder feeding rate is controlled by adjusting a rotating speed of the drums and changing powder spoons with different sizes.

7. The preparation method of claim 1, wherein the step of successively spraying the amorphous alloy powder and the tungsten powder by the double nozzles comprises spraying the amorphous alloy powder first and then spraying the tungsten powder, and then spraying the binder to bond the powders into a bonding layer,
 the step of repeating operations of successively spraying the powders by the double nozzles comprises spraying the amorphous alloy powder first and then spraying the tungsten powder, and then spraying the binder, so as to print the preformed compact composed of multiple bonding layers.

8. The preparation method of claim 1, wherein the capsule is made of stainless steel or nickel material, and has a thickness of 0.5 mm to 2 mm.

9. The preparation method of claim 1, wherein a holding time of the capsule in the heating furnace is 5 min to 20 min, during which a vacuumizing pipe of the capsule is connected to a vacuum pump, and after vacuumizing, the vacuumizing pipe is heated with oxyhydrogen flame, and then pinched off by a hydraulic clamp when the vacuumizing pipe is red hot to seal the capsule.

10. The preparation method of claim 1, wherein the hot isostatic pressure sintering and the hot press forming are carried out with an inert gas as a pressure transmitting medium.

* * * * *